(12) United States Patent
Blinn (10) Patent No.: US 6,184,891 B1
(45) Date of Patent: Feb. 6, 2001

(54) FOG SIMULATION FOR PARTIALLY TRANSPARENT OBJECTS

(75) Inventor: James F. Blinn, Bellevue, WA (US)

(73) Assignee: Microsoft Corporation, Redmond, WA (US)

(*) Notice: Under 35 U.S.C. 154(b), the term of this patent shall be extended for 0 days.

(21) Appl. No.: 09/047,958

(22) Filed: Mar. 25, 1998

(51) Int. Cl.[7] .................................................. G06T 15/50
(52) U.S. Cl. ...................... 345/426; 345/431; 345/435
(58) Field of Search ................................. 345/426, 431, 345/153, 435, 473, 510

(56) References Cited

FOREIGN PATENT DOCUMENTS

| 2 207 585 | 2/1989 | (GB) . | |
|---|---|---|---|
| 07021407 | * 1/1995 | (JP) | ................................. G06F/15/72 |
| 97/10570 | 3/1997 | (WO) . | |

OTHER PUBLICATIONS

"Layered Representations for Vision and Video"; Adelson, E.H., Dept. of Brain & Cognitive Science, MIT; Proceedings IEEE workshop on Representation of Visual Scenes, 1995; ISBN:0–8186–7122–X, Jun. 1995.*

"Particle Systems", *Computer Graphics, Principles and Practice*, 2$^{nd}$ Ed., James D. Foley, Andries van Dam, Steven K. Feiner, and John F. Hughes, Addison–Wesley Publishing Co., Nov. 1991, pp. 1031–1034.

"Fog", *Open GL Programming Guide, the Official Guide to Learning Open GL, Release 1*, Jackie Neider, Tom Davis, and Mason Woo, Addison–Wesley Publishing Co., 1993, pp. 216–223.

"Compositing Digital Images", *Computer Graphics*, vol. 18, No. 3, Thomas Porter and Tom Duff, ACM, 1984, pp. 253–259.

* cited by examiner

*Primary Examiner*—Mark Zimmerman
*Assistant Examiner*—Mano Padmanarhan
(74) *Attorney, Agent, or Firm*—Klarquist Sparkman Campbell Leigh & Whinston, LLP (57) ABSTRACT

A method for simulating fog in 3D graphics rendering applications correctly computes fogged pixel colors even in graphics scenes where two surfaces overlap and the front-most surface is partially transparent. The method computes the fog for each surface according to the following formula: $fF$ atop $A$, where $f$ is the amount of fog, $F$ is the color of the fog, and $A$ is the color of the pixel being fogged. Each fogged surface can be rendered independently to a separate image layer, called a fogged image layer. The graphics rendering system can then simulate the motion of a fogged image layer by moving the fogged layer in an (x,y) plane without re-computing the fogged pixels, or by moving the fogged layer in the z-direction and independently re-computing the moving fogged layer with a new value for the amount of fog applied to the image layer. The method applies to scenes where there are several fogged layers and to scenes that simulate fire and glow with pixels that are totally transparent but have non-zero color values.

19 Claims, 5 Drawing Sheets

FOG SIMULATION FOR PARTIALLY TRANSPARENT OBJECTS

FIELD OF THE INVENTION

The invention relates to a technique used in three-dimensional (3D) graphics rendering to simulate fog.

BACKGROUND OF THE INVENTION

In 3D graphics rendering, fog simulation is a rendering technique that can be used to simulate atmospheric effects such as haze, fog and smog. Fog is a general term that encompasses a variety of atmospheric effects such as haze, mist, smoke or pollution. Some computer-generated images tend to appear unrealistically sharp and well defined. Fog can make a computer-generated image more natural by making objects fade into the distance. When fog is simulated in a graphics scene, the objects gnat are farther from the viewpoint start to fade into the color of the fog.

In conventional graphics rendering architectures, like OpenGL, the author of a graphics scene can control the density of the fog as well as the fog color. The density of the fog is controlled by a parameter called the fog blend factor or fog dissolve factor, f. The fog color is typically represented as a vector value such as $F=[F_{red}, F_{green}, F_{blue}, 1]$. The color F is expressed in conventional vector algebraic notation, including four components: red, green, blue and alpha. Alpha is the opacity of the pixel, and typically ranges from 0 (totally transparent) to 1 (totally opaque). Note that the alpha value of the fog is set to 1, which means that the fog is simulated as being totally opaque. The extent to which an object appears to fade into the fog depends on the fog factor, and specifically, how much fog exists between the viewpoint and the object. Both the fog color and the fog factor are terms in a fog model used to compute the value of a fogged pixel given the color and opacity of an input pixel, such as $A=[A_{red}, A_{green}, A_{blue}, A_{\alpha}]$.

The fog factor, $f$, represents an amount of fog. One way to describe the amount of fog at a given location in a graphics scene is to define it as the fog influence between the viewpoint of the graphics scene and the depth of an object relative to the viewpoint. More specifically, the fog factor is typically calculated as a function of z, the depth of an object from the viewpoint. For example one expression for $f$ is:

$$f = 1 - e^{-\tau Z_A},$$

where $\tau$ is the optical depth and $Z_A$ is the depth of the object from the viewpoint. The value of $f$ can be computed by a variety of other functions in the OpenGL graphics programming language from Silicon Graphics, and the Direct3D graphics programming interface from Microsoft. It is important to note that the notation for the dissolve factor is slightly different in some graphics programming languages. For example, in OpenGL, the value of $f$ in the above equation actually corresponds to $(1-f)$ in OpenGL rotation.

Figure 1:
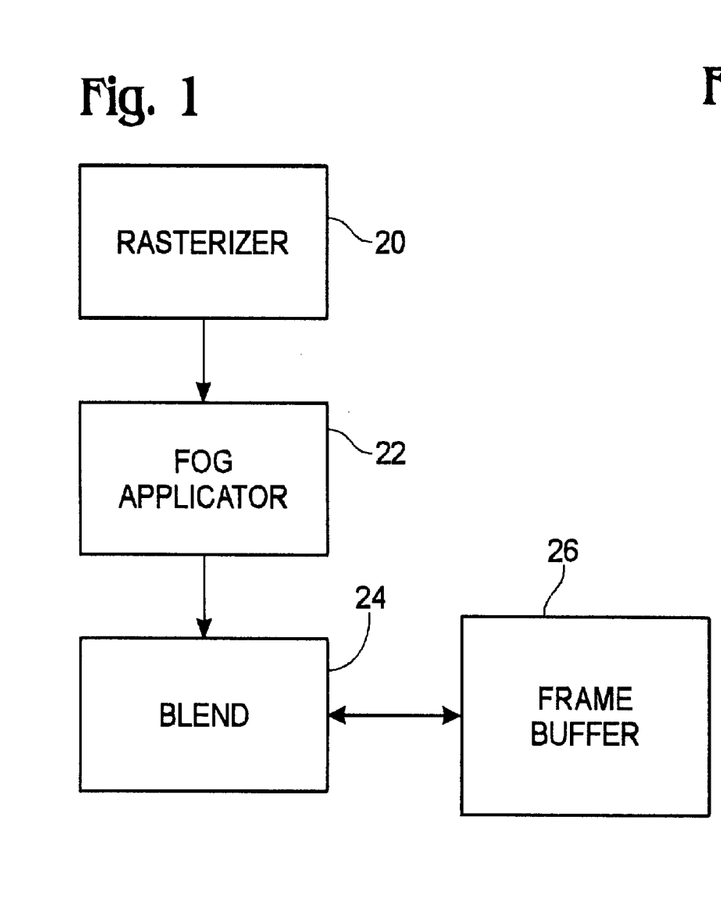
FIG. 1 is a block diagram illustrating how fog is typically applied to pixels in a conventional 3D graphics rendering pipeline.

FIG. 1 is a block diagram illustrating how fog is typically applied to pixels in a conventional 3D graphics rendering pipeline. The rasterizer 20 is a stage in the graphics rendering pipeline where a geometric primitive used to model the surface of an object is converted into pixel values. In a geometric processing stage, the objects in a scene are clipped to a view volume and geometrically transformed to a view space, corresponding to a display screen. The rasterizer 20 takes the transformed geometric primitives (e.g., polygons) as input and computes the color of each pixel within the polygon. Typically, conventional rasterizers interpolate color values at a polygon's vertices to compute the color values at a pixel location within the polygon. The fog applicator 22 then modifies the color values of a pixel by applying an amount of fog of a predetermined color to interpolated color values. The blend unit 24 is responsible for blending pixels from the rasterizer and fog applicator with pixel values at corresponding pixel locations in the frame buffer 26. The frame buffer is memory that stores an array of pixel values corresponding to the picture elements in a display device. When the graphics rendering pipeline completes the rendering of a graphics scene, the frame buffer has an array of pixels representing an output image for display on a display screen.

During rendering, the rasterizer 20 processes a stream of geometric primitives from the objects in a graphics scene. In some cases, geometric primitives can overlap the same pixel location. For example, a graphical object representing a foreground object can have polygons that occlude polygons of a background object. Graphics rendering systems employ a method called hidden surface removal to determine which surfaces are actually visible in a scene. One technique for hidden surface removal is to rasterize unsorted polygons into pixels with depth values. The blend unit 24 then determines whether an input pixel generated by the rasterizer occludes a previously generated pixel in the frame buffer at the same pixel location. If it does, the blend unit 24 replaces the pixel in the frame buffer with the new pixel. If it does not, the blend unit 24 discards the new pixel. An alternative technique is to sort the polygons in depth order and rasterize them in front to back order.

The process of computing pixel values in the frame buffer gets more complicated for partially transparent pixels since it is often necessary to combine the frontmost opaque pixel with partially transparent pixels in front of it. In some architectures that support partially transparent pixels, the blend unit 24 includes logic to combine partially transparent pixel values (sometimes called pixel fragments) at a pixel location into a final output pixel. Some architectures also rasterize geometric primitives at a subpixel resolution and then blend the pixel values of the subpixels in the neighborhood of each pixel location to compute final pixel values at each pixel location.

As illustrated in FIG. 1, the fog applicator 22 receives input pixels from the rasterizer and modifies them to simulate fog. The manner in which the fog applicator modifies a pixel (or pixel fragment) to simulate fog depends on the fog model or models implemented in it.

The conventional model for fogging a pixel A by the amount $f$ of fog color F is:

$$fF + (1-f)A,$$

where A is the color of the pixel being fogged.

The conventional formula for fog simulation will generate the wrong pixel color if two fogged surfaces overlap on the screen <u>and</u> the frontmost surface is partially transparent. A fogged surface refers to a rendering of the surface of a 3D object into pixel values where the pixel values are modified due to the influence of fog on the object's surface.

There are two primary cases where a surface is partially transparent: 1) some of the geometric primitives (e.g., polygons) used to model the surface of an object may only partially cover a pixel location in screen space; and 2) some of the geometric primitives used to model the surface of an object may be translucent. In both cases, the pixels generated by the rasterizer might have an opacity value (alpha) indicating that the pixel is not opaque.

The best way to illustrate the problem with the conventional approach in these cases is to consider an example.

Figure 2:
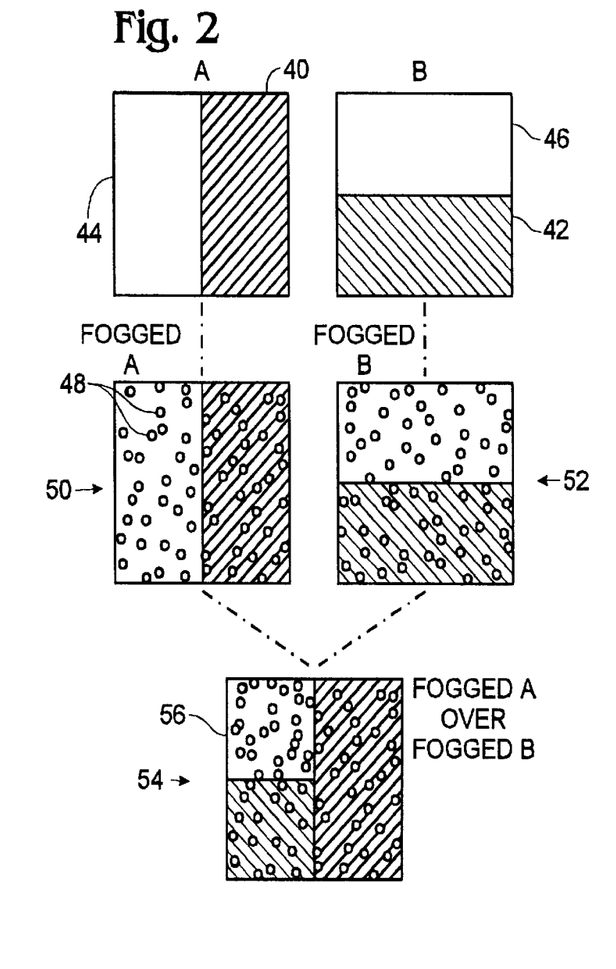
FIG. 2 is a diagram of two partially covered pixels illustrating the problem of the conventional fog simulation formula in combining partially transparent pixels.

FIG. 2 is a diagram illustrating how the conventional fog model produces incorrect results when the two fogged pixels are combined. FIG. 2 shows series of magnified square regions representing pixels A and B. The pixels are the points at the center of each square, and the square regions are at ±½ pixel spacing from the pixels. Pixels A and B each have a partially covered region (hatched regions 40 and 42) and transparent regions (white areas 44 and 46. Assume in this example that pixel A is closer to the viewpoint than B ($Z_A < Z_B$).

The fog is represented as a scattering of dots (e.g., 48) of color F and an amount $f(z)$ corresponding to the fog between the viewpoint and the depth value (z) of the pixel.

Using the conventional formula, the fogged pixels A and B (50, 52) appear as shown in FIG. 2. When the two fogged pixels are composited, the result looks like the square region 54. The result of the compositing operation gives the wrong result because a portion of the fog is counted twice. In FIG. 2, this problem is illustrated in the upper left region 56 of the square 54, where the fog appears denser because a portion of the fog at this region is counted twice. If A and B are composited over a fog background, the final pixel at this location will not be correct because the pixel will have too much fog color. If A and B are composited over another object (e.g., opaque pixel C), the final image will not be correct at this location because the object will receive too much fog color.

In view of this problem with the conventional fog model, there is a need for an improved fog model that accurately simulates fog when applied to scenes with partially transparent objects.

A number of special effects can be achieved by blending or modifying pixel values using image operators. See Porter and Duff, *Compositing Digital Images,* Computer Graphics, Vol. 18, No. 3, at 253–259, July 1984. In this paper, Porter and Duff defined a series of image operators that can be used to combine pixels to compute a composite image. The image operators in this paper are summarized in the following table, which describes how images A and B can be combined in terms of the fractions of A and B present in the final, composite image:

| operation | $A_F$ | $B_F$ |
|---|---|---|
| clear | 0 | 0 |
| A | 1 | 0 |
| B | 0 | 1 |
| A over B | 1 | $1 - A_\alpha$ |
| B over A | $1 - A_\alpha$ | 1 |
| A in B | $B_\alpha$ | 0 |
| B in A | 0 | $A_\alpha$ |
| A out B | $1 - A_\alpha$ | 0 |
| B out A | 0 | $1 - A_\alpha$ |
| A atop B | $B_\alpha$ | $1 - A_\alpha$ |
| B atop A | $1 - B_\alpha$ | $A_\alpha$ |
| A xor B | $1 - B_\alpha$ | $1 - A_\alpha$ |
| A plus B | 1 | 1 |

$A_F$ and $B_F$ represent the fractions of the respective input images that are present in the final, composite image. As Porter and Duff describe, the color component of pixels in the composite image can be expressed as:

$$A_\alpha A_F A_C + B_\alpha B_F B_C,$$

where $A_C$ and $B_C$ are the color components of image A and image B ($A_C = [A_{red}, A_{green}, A_{blue}]$ and $B_C = [B_{red}, B_{green}, B_{blue}]$).

The Porter and Duff operators also include "unary" operators performed on a single image:

darken $(A, \phi) = (\phi A_r, \phi A_b, \phi A_g, \alpha_A)$; and dissolve $(A, \delta) = (\delta A_r, \delta A_b, \delta A_g, \delta \alpha_A)$.

The "over" operator can be used to combine partially transparent pixels into an output pixel. However, the use of the over operator does not solve the problem associated with fog applied to partially transparent objects. Porter and Duff do not address the problem of simulating fog, and more specifically, the problem of simulating fog of partially transparent objects.

SUMMARY OF THE INVENTION

The invention provides an improved method and fog simulator logic for accurately simulated fog for partially transparent objects that overlap other objects in graphics scenes. In contrast to conventional fog simulation, the fog simulation method uses the "atop" operator to fog pixels as follows: $fF$ atop A;

where $f$ is the amount of fog, F is the fog color, and A is the color of the pixel being fogged. The logic for simulating fog can be expressed as:

$$fA_\alpha F + (1-f)A;$$

where $A_\alpha$ is the alpha value for pixel A.

Unlike the conventional method for simulating fog, this method will obtain the correct result even when a partially transparent object is in front of a background object. The foreground object may be partially transparent because it has translucent portions or as a result of anti-aliasing computations.

In a graphics rendering system, this fog method is applied after computing the color of the pixel being fogged. The fogged pixel can then be composited with another pixel at the same location. This method applies particularly well to a layered graphics rendering pipeline where geometry in a graphics scene is rendered to separate image layers called sprites. A fogged image layer can be stored and re-used as long as the object rendered to the image layer moves in an (x,y) plane. If an object moves in the z direction, then it can be re-rendered independently and fogged using a new amount of fog representing the fog between the viewpoint and the object.

Additional features and advantages of the invention will become more apparent from the following detailed description and the accompanying drawings.

DETAILED DESCRIPTION

Introduction

As introduced in the background section, the conventional technique for simulating fog generates an incorrect result when two partially transparent surfaces overlap on the screen. A more accurate approach for simulated fog can be expressed by the following formula for fogging a pixel A by the amount $f$ of fog color F:

$$fF \text{ atop } A \equiv fA_\alpha F + (1-f)A,$$

where A is the color of the pixel being fogged.

This fog model differs from the conventional model in that it reduces fog color applied to the pixel by the degree to which the pixel is partially transparent, or in other words, by the pixel's alpha value, $A_\alpha$. One significant advantage of this approach is that it enables partially transparent surfaces to be fogged independently and then composited to compute an image that accurately simulates fog.

The "atop" operator refers to an image,e compositing operator described in Porter and Duff. The atop operator gives the portion of the first term $fF$ that overlaps the second term A, in union with the portion of the second term A outside of the first term. Imagine the first term as a table cloth and the second term as a table. The expression table cloth atop table includes table cloth where it is on top of the table, and the table; otherwise, the area beyond the edge of the table is out of the picture. Thus, if A is partially transparent, it only receives fog on its non-transparent portion. The color values of the pixel A are expressed as:

$$A = [A_{red}, A_{green}, A_{blue}, A_\alpha].$$

The alpha of the pixel defines the extent to which it is partially transparent, and is typically a number between 0 and 1, inclusive (or 0 to 255 in an 8 bit binary number). The alpha can represent the translucency of the pixel or the extent to which an opaque pixel is covered by a polygon as a result of antialiasing computations.

The color values of the fog F are expressed as:

$$F = [F_{red}, F_{green}, F_{blue}, 1].$$

The amount of fog $f$ is the amount of fog in front of the pixel A (between the viewpoint and the depth of the pixel, z). The value of $f$ in this notation ranges from 0 at the viewpoint to 1 at a point infinitely far from the viewpoint.

It is important to emphasize that some graphics rendering systems use a slightly different notation for the amount of fog. In OpenGL, for example, the amount of fog between the viewpoint and a pixel location on the surface of a polygon is $(1-f)$, instead of $f$ as used above.

The Fog Simulator

Figure 3:
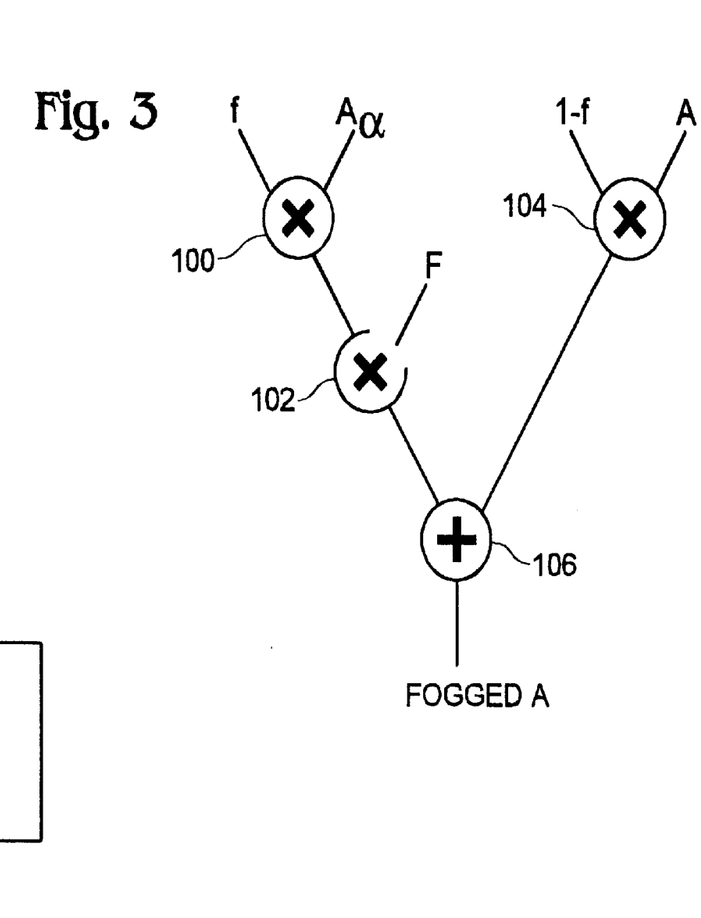
FIG. 3 is a diagram graphically illustrating logic used to apply fog to pixels using, an improved fog model that accurately simulates fog for partially transparent surfaces that overlap other fogged surfaces.

The approach for simulating fog summarized above can be incorporated into 3D graphics rendering systems implemented in software, hardware or a combination of both. Regardless of the implementation details of the rendering pipeline, the pixel processing operations for simulating fog based on the fog model above is substantially the same in both hardware and software platforms. FIG. 3 is a diagram graphically illustrating the logic used to apply fog to pixels based on the formula described in the introduction section.

In FIG. 3, the mathematical operators of the fog model are functional units in the fog logic. Note that there are many ways to express the fog model using different operators that achieve the same result. The logic shown in FIG. 3 is just one example to show how fog can be applied to a pixel using the atop operator.

The fog logic in this example includes three multipliers 100, 102 and 104 and an adder 106. The first multiplier 100 multiplies the fog amount $f$ and the alpha of the pixel generated by the rasterizer. The second multiplier 102 takes this intermediate result ($fA_\alpha$) and multiplies it by the fog colors. The second multiplier is a vector multiplier that multiplies the color components of F by the scalar quantity ($fA_\alpha$).

The third multiplier 104 is also a vector multiplier that multiplies the color values of A by the scalar quantity $(1-f)$ to generate another intermediate result. The adder 106 is a vector adder that combines the scaled color values from the vector multipliers 102 and 104. The result is a fogged pixel, fogged A.

The fogged pixel can be composited with fogged pixels from other surfaces at the same pixel location and produce the correct result even if the other surfaces are partially transparent at the pixel location. Specifically, fogged pixels from different surfaces can be combined in back-to-front order using the over operator. A description of how to combine fogged pixels for more complex geometry is explained further below.

Figure 4:
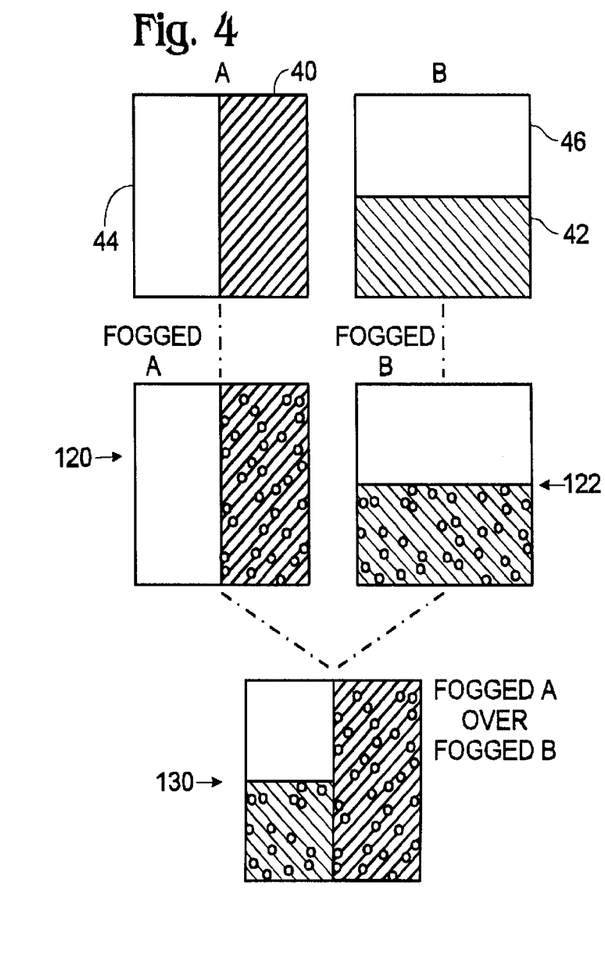
FIG. 4 is a diagram illustrating how the fog logic shown in FIG. 3 solves the problem that occurs when a partially transparent surface overlaps another surface.

The logic for simulating fog solves the problem associated with fogging partially transparent surfaces that overlap other fogged surfaces. To illustrate this point, it is helpful to consider an example showing how the logic computes a fogged pixel using the fog logic shown in FIG. 3. FIG. 4 is a diagram illustrating how the fog logic shown in FIG. 3 solves the problem that occurs when a partially transparent surface overlaps another surface. FIG. 4 is similar to FIG. 2 described in the background section in that it shows a series of diagrams of the same pixels A and B. However, it differs in that the surfaces A and B are fogged using the atop operator, instead of the conventional fog expression.

As in FIG. 2, region A and region B have opaque portions 40 and 42, and transparent portions 44 and 46. Each of these regions can represent either a partially covered opaque pixel (such as a pixel fragment produced as a result of antialiasing) or a translucent pixel (from a translucent surface that allows light reflected from a background surface to pass through). A translucent pixel is represented geometrically as partially covered region where the size of the covered region is proportional to the alpha of the pixel.

The second row depicts regions A and B (regions 120 and 122) fogged using the atop operator to apply an amount of fog of color F to regions A and B. The amount of fog is the portion of fog between the viewpoint and each surface. For example, the amount of fog applied to region A is the fog between the viewpoint and A, and the amount of fog applied to region B is the fog between the viewpoint and B. When the fogged pixels are combined using the over operator, the composite pixel has the correct amount of fog, as shown by the region 130 in FIG. 4. Note that the upper left corner of the region 130 does not improperly contribute to the color of the region.

Complex Geometry

Figure 5:
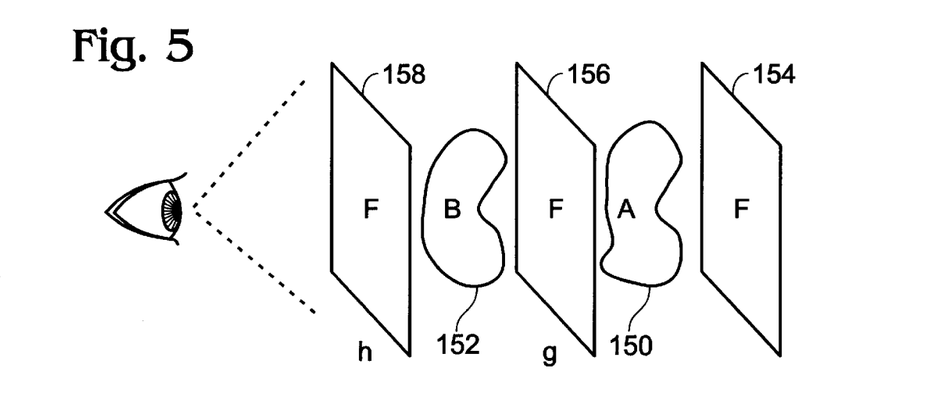
FIG. 5 illustrates an example of a scene with two overlapping objects A and B and the surrounding fog represented in fog layers.

The method for simulating fog described above can be used in complex scenes with several layers of objects and fog. To illustrate the problem, it is helpful to consider an example showing how fog enclosing objects in a graphics scene can be modeled with fog layers. FIG. 5 illustrates an example of a scene with two objects A and B (150 and 152) and the surrounding fog between the viewpoint and the objects represented in fog layers (154–158). Object B at least partially covers Object B, and both objects have partially transparent regions.

Each of the fog layers 154–148 have a fog color F, and an amount of fog representing a portion of fog in 3D space. The background fog layer 154 has a fog amount of 1 since it extends from object A to infinity. Fog layer 156 has an amount of fog g, representing the amount of fog between objects A and B. Finally, fog layer 158 has an amount of fog h, representing the amount of fog between object B and the viewpoint. The amount of fog between the viewpoint and object A is $f$.

Consider that the amount of fog, $f$ is defined as follows:

$$f=1-e^{-\tau z_A}=1-e^{-\tau(z_B+z_{A-B})}=1-e^{-\tau z_B}e^{-\tau z_{A-B}}1-f=e^{-\tau z_A}=e^{-\tau(z_B+z_{A-B})}=e^{-\tau z_B}e^{-\tau z_{A-B}}=(1-h)(1-g)$$

The fog layers and objects can be rendered independently and composited into image layers to compute a final output image. Consider a scene with only object A in front of an opaque fog background (layer 154) of color F. An expression for an image layer representing a rendering of the fogged object A superimposed on the opaque fog background is:

(Fog layer of amount $f$ and color $F$) over ($A$ over $F$)=$fF$ over ($A$ over $F$).

Since the over operator is associative, this expression can be rewritten as:

($fF$ over $A$) over F.

One problem with using the over operator in this manner is that the fogged image layer will have non-zero alpha values across the entire layer. Specifically, for values of $A_\alpha$ ranging from 0 to 1, the fogged image layer will have alpha values ranging from $f$ to 1. Since the fog layers occupy the entire screen, the fogged image layer will occupy the entire screen also and have non-transparent alpha values at every pixel location. One way to avoid having non-zero alpha values at every pixel location in the screen is to set the alpha values of the fogged image layer to zero at every location where the object A is totally transparent, or in other words, where $A_\alpha$=0.

Another way to avoid this problem is to use the atop operator to compute the fogged pixel layer as set forth in the new fog model above:

Fogged $A=fA_\alpha F+(1-f)A$.

Before proceeding to the larger problem of complex scenes, it is useful to examine how the conventional and new fog models compare. Recall that the two fogged image calculations are:

$fF+(1-f)A$ $fA_{\alpha F+}(1-f)A$

These fog models both give the same (correct) result when composited over F. These are just special cases of:

$KF+(1-f)A$ which, when composited over the final background F gives $$(KF+(1-f)A) \text{over} F = KF+(1-f)A+\{1-K-(1-f)A_\alpha\}F$$
$$= (1+K-K-(1-f)A_\alpha)F+(1-f)A$$

Since the K terms cancel, any value for K will satisfy this expression when an object is composited over an opaque fog background. This observation can be expressed as the following identity:

if $F_\alpha$=1 then $(KF+B)$ over $F=B$ over $F$     (1)

Scenes with more than one object and layer of fog such as shown in FIG. 5 present a more complex problem. Representing fog as image layers, a layered graphics rendering system can compute the final image by using the over operator to combine image layers representing the objects and fog layers. For example, the final image can be represented as:

(hF over B over gF over A ) over F.

To arrive at this expression, one can start by compositing the front four layers:

$$hF \text{ over } B \text{ over } gF \text{ over} A = (hF+(1-h)B)\text{over}(gF+(1-g)A)$$
$$= hF+(1-h)B+$$
$$\{1-h-(1-h)B_\alpha\}(gF+(1-g)A)$$
$$= (h+g-gh-g(1-h)B_\alpha)F+$$
$$(1-h)B+(1-h)(1-B_\alpha)(1-g)A$$

The fog factor g can be eliminated by substituting an expression for g in terms of $f$.

$hF$ over $B$ over $gF$ over $A=(f-(f-h)B_\alpha)F+(1-h)B+(1-B_\alpha)(1-f)A$

This result is then composited over the opaque fog background. Because of identity (1), the step of compositing this result over an opaque background ($F_\alpha$) can be written as:

$(hF$ over $B$ over $gF$ over $A)$ over $F=((1-h)B+(1-B_\alpha)(1-f)A)$ over F.

It would be advantageous to find a new fog model of the form:

(B foggedby h) over (A foggedby $f$) over F;

where the "foggedby" operator is an image operator used to simulate the fog in between the view point and an object. The new method for simulating fog described above can be substituted for the "foggedby" operator as follows:

(hF atop B) over ($fF$ atop A) over F.

This approach has a number of advantages. First, objects like A that are partially occluded by other objects (e.g., B ) are fogged using a fog layer having a fog amount $f$, the fog amount from the viewpoint all the way to A. Thus, the fog can be computed for A independently of B. In other words, the fog can be computed for A, without regard to whether another object overlapping A is present in the scene. Second, the fogged objects A and B can be rendered to separate image layers and composited later to construct an output image. As a result, the graphics rendering system can approximate motion of fogged objects in x and y dimensions (in a plane at the same depth from the viewpoint) without re-rendering the fogged layers. In addition, the rendering system can simulate the motion of an object in the z-direction (depth from the viewpoint) by rasterizing the layer that moves in the z-direction independently with new values for the amount of fog between the object and the viewpoint.

Figure 6:
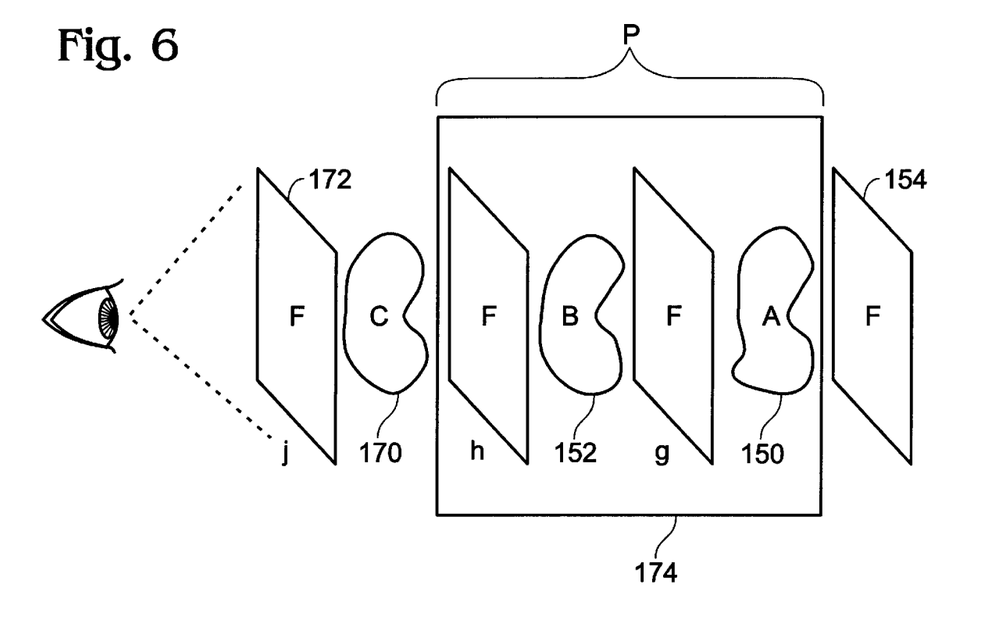
FIG. 6 illustrates an example of a scene with several overlapping objects and fog to illustrate how the atop operator can be used to independently compute fog for object layers.

The expression for simulating fog on two objects A and B can be extended to an arbitrary number of layers of fogged objects. FIG. 6 extends the example in FIG. 5 by adding another object C (170) with a fog layer 172 of amount j in front of C. Part of the scene, P (174), from FIG. 5 can be treated as a single image layer since these portions of the scene are composited into a layer as explained above. The object C and the portion P are in front of an opaque fog background 154.

The new fog layer jF and object C can be overlaid on the combined layer P using the over operator as follows:

$$jF \text{ over } C \text{ over } P = (jF + (1 - j)C) \text{ over } P$$
$$= jF + (1 - j)C + \{1 - j - (1 - j)C_\alpha\}P$$
$$= jF + (1 - j)C + (1 - j)(1 - C_\alpha)P$$

In a general stack of objects, each object pixel A, B, C etc. will be multiplied by terms of the form $(1-C_\alpha)$ for all of the objects in front of it, and by all the terms of form $(1-j)$ for each fog layer in front of it.

The atop operator can also be used to combine layers of objects and fog as follows:

$$(jF \text{ atop } C) \text{ over } P' = (jC_\alpha F + (1 - j)C) \text{ over } P'$$
$$= jC_\alpha F + (1 - f)C + \{1 - jC_\alpha - (1 - j)C_\alpha\}P'$$
$$= jC_\alpha F + (1 - f)C + (1 - C_\alpha)P'$$

The methods using the over and the atop operator differ because they use a different amount of fog for each layer. In the first method, the over operator builds up net pixel color using individual fog slice amounts j, h, and g by the nested products:

$$jF+(1-j)C+(1-j)(1-C_\alpha)\{(1-h)B+(1-h)(1-B_\alpha)\{(1-g)A\}\}.$$

In the second method, the atop operator builds the net pixel color using total fog depth amounts j, k, m. These total fog amounts can be defined in terms of the slice amounts as:

| | |
|---|---|
| j | fog from viewpoint to C |
| $k = 1 - (1 - j)(1 - h)$ | fog from viewpoint to B |
| $m = 1 - (1 - j)(1 - h)(1 - g)$ | fog from viewpoint to A |

The net product generated by the atop operator is then:

$$jC_\alpha F+(1-j)C+(1-C_\alpha)\{(1-k)B+(1-B_\alpha)\{(1-m)A\}\}$$

The use of the over and atop operators as described above to compute net pixel color from several layers of fog and objects obtains the same result, but the atop operator has some advantages. First, it is more convenient to use the atop operator because it uses the total amount of fog from the viewpoint to the object. The total amount of fog is easier to compute and facilitates independent rendering of each fogged object, e.g., A, B, and C. In addition, the use of total fog amounts, instead of amounts of slabs or slices of fog, is necessary in cases where the expression for the fog amount is such that the following identity no longer holds:

$$(1-f)=(1-h)(1-g).$$

For example, this expression is true for the following definitions of f, g, and h:

$f=1-e^{-\tau Z_A}$ $g=1-e^{-\tau(Z_A-Z_B)}$ $h=1-e^{-\tau Z_B}$

However, the identity might not be true for other fog expressions. Thus, the new model for simulating fog, which uses the total amount of fog from the viewpoint to the object, is a more accurate and more general model for a variety of expressions for the fog amount.

Fire and Glow

The new fog model using the atop operation is also accurate when used in conjunction with glowing objects. Glowing objects such as fire add brightness to a pixel but do not affect its opacity, alpha. A glowing object can be simulated with glow pixels that have a zero alpha component and non-zero color components. The simple 'over' operator with $A_\alpha=0$ then becomes:

$$A \text{ over } F = A + (1 - A_\alpha)F$$
$$= A + F$$

One design issue that results from adding glow pixels in this manner is that the resulting color values must fall within a range of the allowable color values in the graphics rendering system. For example, in some systems, this range might be from 0 to 1 (or 0 to 255 for 8 bit color values). To address this issue, the rendering system clamps the color values such that they are limited to the predetermined range. The discussion below, describing how the fog model applies to glowing objects, explains how to use clamping.

The expression for simulating a fogged, glowing object is:

$(fA_\alpha F+(1-f)A)$ over F

It might appear that having $A_\alpha=0$ would give the wrong result because it removes the contribution of fog in front of the object A. However, the fog model does generate the correct result because of the identity:

if $F_\alpha=1$ then $(KF+B)$ over $F=B$ over $F$

The fogged, glowing sprite has no fog color in it. For $A_\alpha=0$, the first term of the fog model is zero such that:

$(fA_\alpha F+(1-f)A)=(1-f)A$

When placed over the background color F, the proper amount of f shows through to account for the fog color in front of A, i.e. fF, as well as the amount of fog peeking through the fogged A, $(1-f)F$. That is, $fF$ over $A$ over $F=(fF$ atop $A)$ over $F$ independently of any value for $A_\alpha$.

To demonstrate that the new fog model does not result in any errors due to clamping, consider an example of two pixels, each with one representative color component:

$C = [C_c C_\alpha]$; $D = [D_c D_\alpha]$

The expression for computing C over D on one of the color component and the alpha component can be written as:

$$C \text{ over } D = [\text{clamp}(C_c + (1-C_\alpha)D_c)C_\alpha + (1-C_\alpha)D_\alpha]$$

It is not necessary to clamp the alpha channel because it will always result in a value from 0 to 1, inclusive, if the original alpha values are in that range. A series of over operations should ideally be carried out using an extended range such that clamping can be deferred to the last possible operation. One technique using this approach is demonstrated in the first example below.

Consider the three following cases for simulating glowing objects in fog using $A = [A_c 0]$, $F = [F_c 1]$:
1) 'over' evaluated front to back: ($fF$ over A) over F. This can be evaluated as:

$$fF \text{ over } A = [\text{clamp}(fF_c + (1-f)A_c)f + (1-f)0]$$
$$= [fF_c + (1-f)A_c f]$$
$$\equiv R$$

The clamping operation can be avoided since its argument can never be greater than one.

$$R \text{ over } F = [\text{clamp}((fF_c + (1-f)A_c) + \{1-f\}F_c)f + (1-f)1]$$
$$= [\text{clamp}((1-f)A_c + F_c)1]$$

This approach loses a minimal amount of information since the earlier clamp operation is unnecessary.
2) 'over' evaluated back to front: $fF$ over(A over F)

$$A \text{ over } F = [\text{clamp}(A_c + (1-0)F_c)0 + (1-0)1]$$
$$= [\text{clamp}(A_c + F_c)1]$$
$$\equiv R$$

Note that the clamp is necessary here because the argument to the clamp operation can be greater than 1.

$$fF \text{ over } R = [\text{clamp}(fF_c + (1-f)\text{clamp}(A_c + F_c))f + (1-f)1]$$
$$= [\text{clamp}(fF_c + (1-f)\text{clamp}(A_c + F_c))1]$$

This approach yields a different and arguably incorrect answer.
3) 'atop' evaluated as: ($fF$ atop A)over F $$fF \text{ atop } A = [\text{clamp}(fF_c \cdot 0 + (1-f)A_c)0]$$
$$= [(1-f)A_c \; 0]$$
$$\equiv R$$

The clamp is not necessary here because the argument of the clamp operation cannot be greater than 1.

$$R \text{ over } F = [\text{clamp}((1-f)A_c + (1-0)F_c)0 + (1-0)1]$$
$$= [\text{clamp}((1-f)A_c + F_c)1]$$

This approach yields the correct result.

Graphics Rendering Systems

Figure 7:
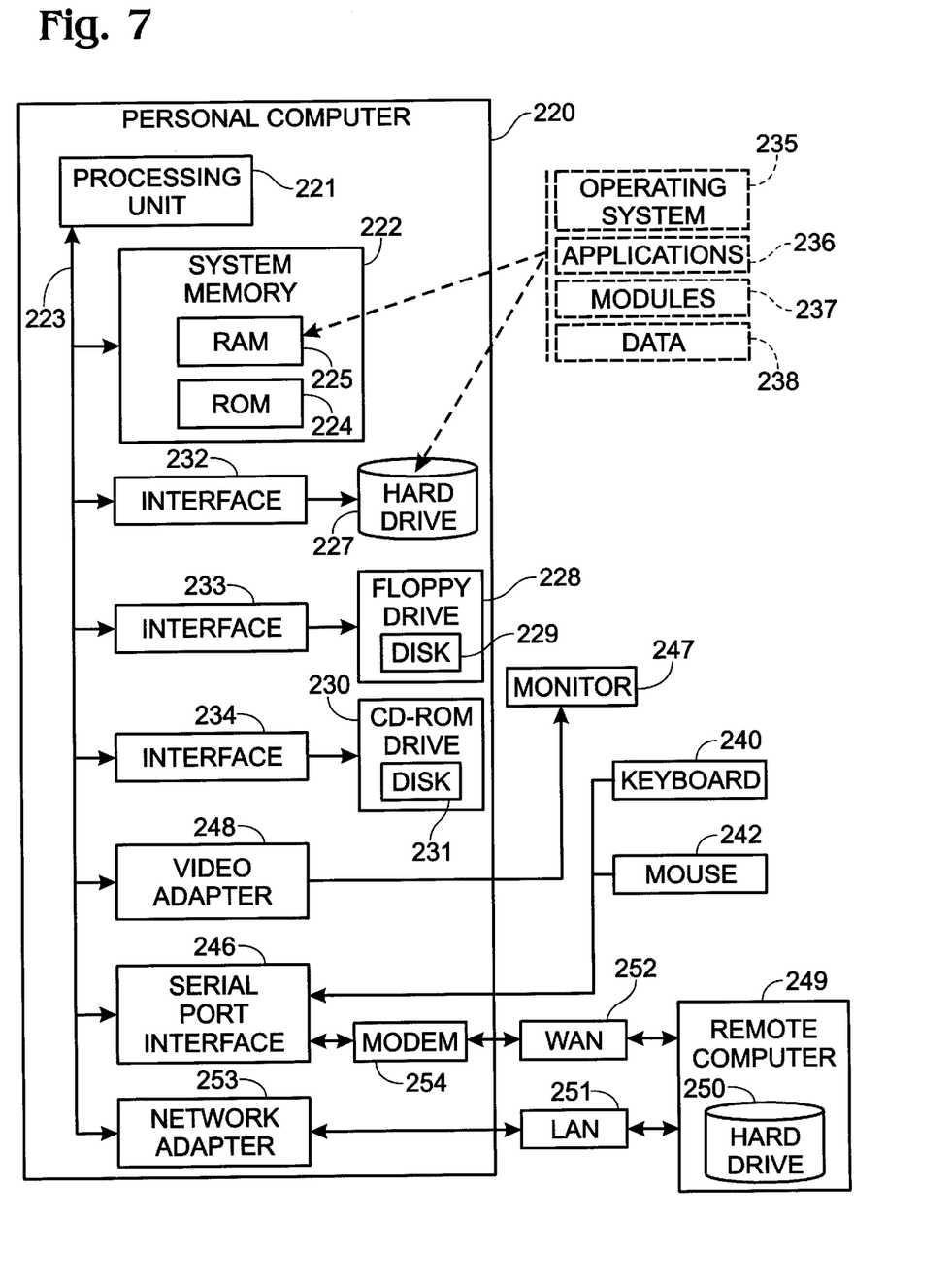
FIG. 7 is a block diagram illustrating an example of a computing environment in which a software rendering system can be implemented.

FIG. 7 and the following discussion are intended to provide a brief, general description of a suitable computing environment in which a software rendering system or the front end of special purpose graphics rendering hardware can be implemented. The methods for simulating fog can be incorporated into rendering systems designed for commercially available graphics programming environments such as the OpenGL programming language from Silicon Graphics Corp. or Direct3D from Microsoft Corp.

In software rendering systems, the stages of the graphics rendering pipeline, including traversing the scene database (display traversal), transforming objects to the view space, and rasterizing objects (hidden surface removal, scan conversion, pixel blending, antialiasing, shading, fog, and texture mapping) are performed by software modules executing on a computer. Generally, these modules include routines, programs, components, data structures, etc. that perform particular tasks or implement particular abstract data types. The software that implements the rasterizer (including a fog applicator as detailed above) can be executed in a variety of computer system configurations, including multiprocessor systems, microprocessor-based or programmable consumer electronics, minicomputers, mainframe computers, and the like. The software for simulating fog can be implemented in a series of computer-executable instructions in the rasterizer. Main memory or video memory on a display controller can be used to store intermediate pixel values.

The graphics rendering system may be executed in distributed computing environments where tasks are performed by remote processing devices that are linked through a communications network. In a distributed computing environment, program modules may be located in both local and remote memory storage devices.

FIG. 7 shows an example of a computer system for implementing a software rendering system. The computer system includes a conventional computer 220, including a processing unit 221, a system memory 222, and a system bus 223 that couples various system components including the system memory to the processing unit 221. The system bus may comprise any of several types of bus structures including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system 226 (BIOS), containing the basic routines that help to transfer information between elements within the personal computer 220, such as during start-up, is stored in ROM 224. The personal computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the personal computer 220. Although the description of computer-readable media above refers to a hard disk, a removable magnetic disk and a CD, other types of media which are readable by a computer, such as magnetic cassettes, flash memory cards, digital video disks, Bernoulli cartridges, and the like, may also be used in this computing environment.

A number of program modules may be stored in the drives and RAM 225, including an operating system 235, one or more application programs 236, other program modules 237, and program data 238. A user may enter commands and information into the personal computer 220 through a keyboard 240 and pointing device, such as a mouse 242. Other input devices (not shown) may include a microphone, joystick, game pad, satellite dish, scanner, or the like. These and other input devices are often connected to the processing unit 221 through a serial port interface 246 that is coupled to the system bus, but may be connected by other interfaces, such as a parallel port, game port or a universal serial bus (USB). A monitor 247 or other type of display device is also connected to the system bus 223 via an interface, such as a video adapter 248. In addition to the monitor, personal computers typically include other peripheral output devices (not shown), such as speakers and printers.

The personal computer 220 may operate in a networked environment using logical connections to one or more remote computers, such as a remote computer 249. The remote computer 249 may be a server, a router, a peer device or other common network node, and typically includes many or all of the elements described relative to the personal computer 220, although only a memory storage device 250 has been illustrated in FIG. 7. The logical connections depicted in FIG. 7 include a local area network (LAN) 251 and a wide area network (WAN) 252. Such networking environments are commonplace in offices, enterprise-wide computer networks, intranets and the Internet.

When used in a LAN networking environment, the personal computer 220 is connected to the local network 251 through a network interface or adapter 253. When used in a WAN networking environment, the personal computer 220 typically includes a modem 254 or other means for establishing communications over the wide area network 252, such as the Internet. The modem 254, which may be internal or external, is connected to the system bus 223 via the serial port interface 246. In a networked environment, program modules depicted relative to the personal computer 220, or portions of them, may be stored in the remote memory storage device. The network connections shown are just examples and other means of establishing a communications link between the computers may be used.

Implementation of the Layered Graphics Rendering Pipeline

As described above, the new fog model is particularly useful in a real time, layered graphics rendering pipeline where fogged objects can be rendered independently to fog layers and then composited to form an output image. One implementation of a layered graphics rendering pipeline is described in co-pending U.S. patent application Ser. No. 08/671,412 by Nathan P. Myhrvold, James T. Kajiya, Jerome E. Lengycl, and Russell Schick, entitled Method and System for Generating Images Using Gsprites, filed on Jun. 27, 1996, which is hereby incorporated by reference. This particular rendering system can independently render objects or parts of objects in a scene to separate image layers called sprites. For convenience, we describe the details of the architecture here. It should be noted that conventional rendering architectures can be adapted to emulate a layered graphics pipeline by rendering objects to separate layers and then using the pixel fill capacity of the rasterizer to composite intermediate pixel values in the image layers.

Figure 8:
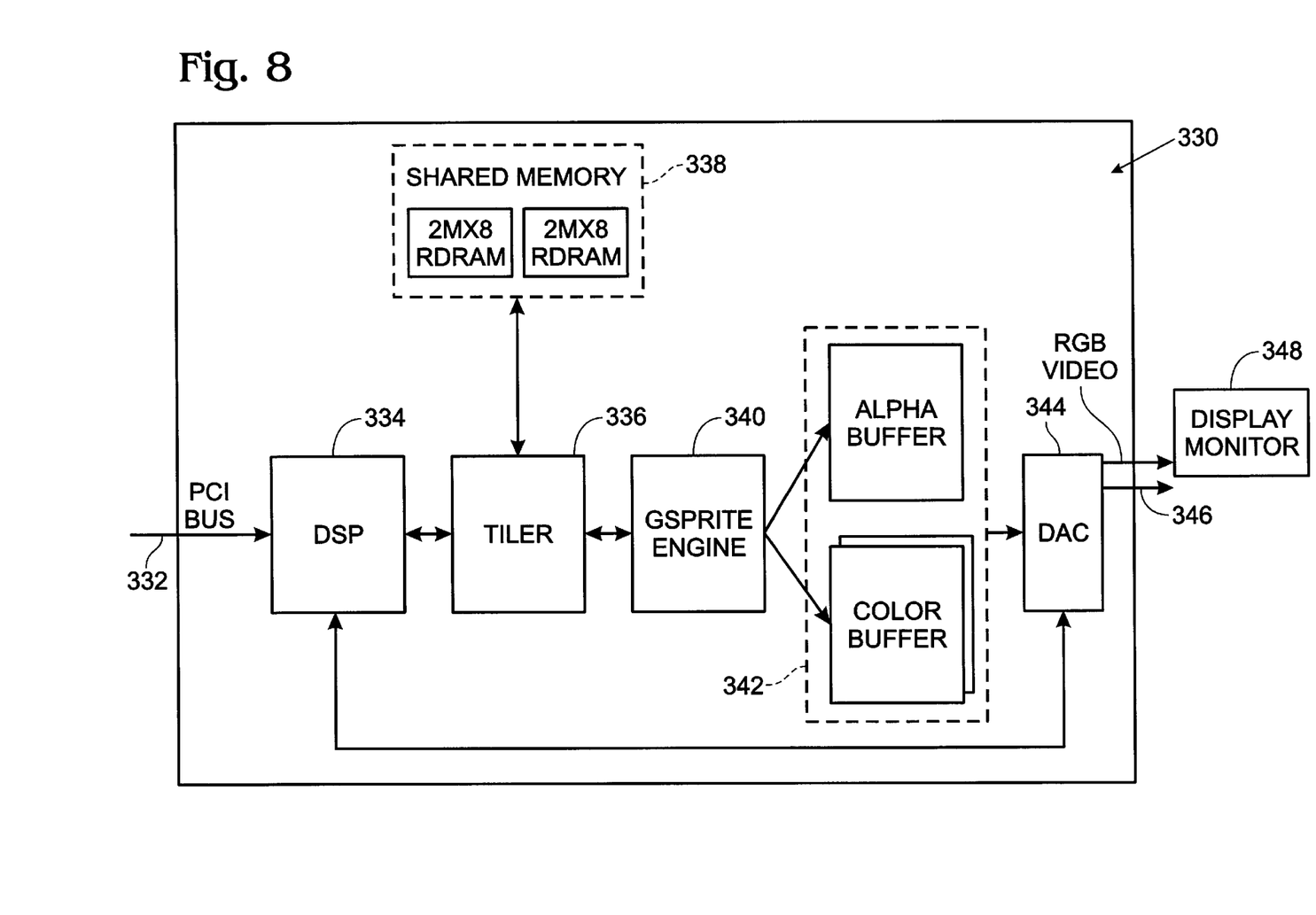
FIG. 8 is a block diagram illustrating an implementation of a layered graphics rendering system.

FIG. 8 is a block diagram illustrating one possible implementation of a layered graphics rendering system 330. This implementation is designed to communicate with a host computer (such as the computer in FIG. 7) through a bus 332. The architecture of the layered graphics system can also be designed such that the microprocessor of the host PC is used in place of the DSP 334.

This particular implementation includes a DSP 334, tiler 336, shared memory 338, gsprite engine 340, compositing buffer 342, and digital-to-analog converter (DAC) 344. The bus 332 transfers rendering commands and data (polygons and rendering attributes) between the host and the DSP 334. In response to rendering commands from the host, the rendering system renders independent scene elements to sprites, combines the sprites into display images, and transfers the display images to a display device through the DAC 344. The independent scene elements are typically contiguous objects (e.g., a robot in a game) or parts of an object (e.g., the robot's arm).

The shared memory 338 stores image processing commands and sprites in a specific sprite format called a gsprite (generalized sprite). In this implementation, the shared memory is used to store gsprite and texture data, DSP code and data, and buffers used to transfer data between processing subsystems. The shared memory 316 shown here comprises 4 Mbytes of RAM, and is implemented using two 8-bit Ram bus channels.

The DSP 334 is responsible for performing front end geometry processing, and sprite management. Specifically, the DSP performs front end geometry and lighting calculations used for 3-D graphics. This includes model and viewing transformations, clipping, and lighting. The DSP also performs sprite management including 1) computing sprite transforms, 2) sorting geometry assigned to a sprite among 32×32 sample chunks; 3) tracking sprite motion through characteristic points on the object model rendered to a sprite; 4) computing affine warps to approximate changes in position and lighting of previous renderings; 5) computing the error of a warped image approximation; 6) and regulating rendering resources by dynamically adjusting quality parameters of image layers. It is important to note that the functions of the preprocessor can also be implemented on the host processor, instead of using both the host processor and DSP.

The architecture of the rendering system shown in FIG. 8 is relatively independent of the specific DSP. However, the DSP should preferably have significant floating point performance. Suitable DSPs include the MSP-1 from Samsung Semiconductor and TriMedia from Phillips Semiconductor. These specific DSPs are two examples of DSPs that provide sufficient floating point performance. The host processor can used in place of the DSP and interface directly with the tiler 336 through the bus 332.

The rendering system 330 shown in FIG. 8 manages image data in three different units: gsprites, chunks, and blocks. The system serially renders image layers in 32×32 sample chunks. To prepare an object for rendering to a sprite, the DSP divides a sprite into chunks and sorts geometry assigned to the sprite among the chunks. The DSP also computes a gsprite display list that lists the gsprites for an output image. This display list includes pointers to gsprites, and more specifically, to gsprite data structures called header blocks. The gsprite header block stores a number of attributes of a gsprite including gsprite width, height, and an affine transform defined in terms of a screen space parallelogram (it may be preferable to use a rectangle to reduce anisotropy of sprite samples). The gsprite header block also includes a list of its member chunks. This list is in the form of pointers to chunk control blocks.

The DSP 334 sets up the gsprite header blocks and stores them in shared memory 316. The gsprite header block includes a header for storing various attributes of the gsprite and for keeping track of where related image data is stored in the shared memory. The data structure includes fields to store the size of the gsprite, to represent the edge equations for the screen edges of the gsprite, to maintain 2-D transform data, and other image attributes.

Chunk control blocks include per chunk and per block parameters. The per chunk parameters include compression parameters, pixel format, and whether the pixel data resides in memory managed in Memory Allocation Units (MAU) in linear memory. An MAU is a piece of shared memory used to allocate chunk memory. MAU managed memory includes a list of MAUs (124 bytes for example), each MAU having a pointer to the next MAU. In one specific implementation for example, the chunk control blocks are stored in sequential MAUs for each gsprite.

The per block parameters include the number of MAUs the block spans, and a block pointer pointing to the first byte of pixel data for the block. The specific block format is an 8×8×4 array of pixels that encode 32 bit pixels (8 bits for RGB and Alpha).

The tiler 336 performs scan-conversion, shading, texturing, hidden-surface removal, anti-aliasing, translucency, shadowing, and blending for multi-pass rendering. Preferably the tiler is implemented as a VLSI chip along with the gsprite engine 340. The tiler rasterizes polygons one chunk at a time in a serial fashion to compute pixel fragments. The pixel fragments include translucent and partially covered pixels. In cases where a primitive partially covers a pixel location modeled as 4×4 array of sub-pixel regions, the tiler computes the pixel coverage and stores it in a mask which indicates which sub-pixel regions are covered. The tiler performs hidden surface removal using a z-buffer approach on pixels. It saves the frontmost opaque pixel and any translucent or partially covered pixels in front of the opaque pixel.

The tiler has a double buffered rasterization buffer so that it can compute sprite samples in one buffer, while resolving pixel fragments for samples in the second buffer. The rasterization buffer includes two 32×32 color buffers for double buffering color values of fully covered opaque pixels in the current chunk, a depth buffer for storing depth values for the pixels in the color buffer, and a fragment buffer for storing color, depth, and coverage masks for partially transparent pixels. The tiler composites the fragments and fully covered pixel at pixel locations within a chunk to compute a rendered gsprite chunk, a 32×32 chunk of pixels in a sprite image layer. The tiler stores the resulting rendered gsprite chunks in the shared memory.

The tiler has fog logic used to modify color values calculated by the scan conversion engine (rasterizer) within the tiler. The scan conversion engine scans primitives (e.g., triangles) and interpolates attributes at vertices to generate pixel coverage and interpolated color values. The scan conversion engine also computes the fog factor $f$ for each pixel. The pixel values and associated fog factor $f$ generated by the scan conversion engine are stored in a queue for further processing. A fog applicator implements a fog model as described above to apply fog (of amount $f$ and color F) to each calculated pixel. The output of the fog applicator is transferred to a pixel input processor, which performs depth compare and blending operations to determine how the incoming pixel values should be stored in the rasterization buffer. Once all the primitives in a chunk are rasterized, a pixel output processor resolves the pixel fragments for pixels in the chunk.

The process of resolving pixel fragments includes taking a depth sorted list of fragments for each pixel location in a chunk and compositing them along with the front-most opaque pixel at the pixel location. The pixel output processor sorts the fragments and then uses the opacity and coverage mask to compute the contribution of each fragment to the final pixel color of the output pixel in the sprite. The resolved pixels have RGB color and alpha components.

The gsprite engine 340 operates at video rates to address the gsprite chunk data and perform the necessary image processing for general affine transformations (which include scaling, translation with subpixel accuracy, rotation, reflection and shearing). The gsprite engine can be implemented on the same or a different chip from the tiler 336. If on a separate chip, it interfaces with a memory interface unit in the tiler to access the gsprite data structures in shared memory.

The gsprite engine 340 includes a video timing generator which controls video display refresh, and generates the timing signals necessary to control gsprite accesses. To display each frame, the gsprite engine 340 traverses the gsprite display data structures to determine which sprites need to be read for any given 32-scanline band. For each gsprite in a band, the gsprite engine reads the header block, clips the sprite to the current display band, and places the sprite in the sprite queue for rasterization. The gsprite engine scans each sprite based on the specified affine transform in the gsprite header and generates read requests. To hide the latency of sprite accesses, the gsprite engine utilizes a caching scheme that pre-fetches and caches sprite blocks in a cache memory before a rasterizer computes transformed sprite samples using the cached data.

A simple rasterizer in the gsprite engine scans each sprite based on the specified affine transform in the gsprite header and calculates the filter parameters for each pixel. The gsprite engine uses a filter to map color and alpha data at sample locations in gsprite space to screen space. Specifically, it applies either a 2×2 or 4 by 4 filter kernel to compute pixel values (color or both color and alpha) at pixel locations in screen space.

The gsprite engine has a compositing buffer control for controlling the operation of a compositing buffer. The compositing buffer control passes transformed sprite samples and instructions on how to combine samples from different layers. The compositing buffer control monitors a ready line from the compositing buffer 342 to ensure that the gsprite engine 340 does not overrun the compositing buffer 342.

Gsprite chunk data is processed a number of scan lines at a time for display. In one implementation, chunk data is processed 32 scan lines at a time. This implementation of the compositing buffer (342) includes two 32 scan line color buffers which are toggled between display and compositing activities. The compositing buffer also includes a 32 scan line alpha buffer which is used to accumulate alpha for each pixel. This particular compositing buffer has compositing logic that implements the over image operator. The compositing logic receives transformed sprite samples, and combines them with the accumulated color values using the alpha values from the alpha buffers.

The DAC 344 includes a R G B video DAC and corresponding video port 346, to video editing devices. Individual components can be used to implement the functionality of the DAC. The DAC 344 implements the basic functions that are common to most RAMDACs on the market today. The DAC includes logic for reading and writing internal control registers, and for pipelining the video control signals. The DAC includes pixel data routing logic that controls the routing of pixel data from the compositing buffers. In the normal operating mode, this data is passed at pixel rates to Color LUTs for each of the three channels. The DAC also has a clock generator that generates the video clock. These clocks are generated by two phase locked clock generators to eliminate synchronization drift.

Using the Fog Model on Sprites

While the fog model described above applies to a variety of rendering architectures, it is particularly useful in rendering architectures where objects can be rendered to separate image layers or "sprites." In such systems, the new fog model has implications in two parts of the rendering pipeline: 1) in the tiler, where it is used to generate fogged pixels in a sprite using the atop operator; and 2) in the sprite compositor, where it facilitates compositing of sprites representing fogged objects using the over operator. In the layered architecture described above, the tiler performs the first computation, and the gsprite engine controls the second computation in conjunction with the compositing buffers, which combine sprites using the over operator.

Generating Sprites

To generate fogged sprite pixels, a rendering system applies fog of color F and an amount corresponding to the fog influence from the viewpoint to the surface being rendered.

Given the parameters:

fog amount=$f$ fog color=F=[$F_c$,1]

polygon color=A=[$A_c A_\alpha$]

The fogged sprite color should be:

$$fF \text{ atop } A = fA_\alpha F + (1-f)A$$

$$= [fA_\alpha F_c + (1-f)A_c A_\alpha]$$

The components within the tiler for making this computation are explained further above. In summary, the fog applicator implements logic to perform this calculation using the fog color F, pixel color and alpha A, and fog amount $f$.

Compositing Operations on Fog Sprites

In a layered graphics pipeline, the rasterizer can apply fog to each object independently as it renders the object to a sprite layer. The compositing buffer can then be used to composite fogged object layers and the opaque fog background layer.

Given two objects embedded in fog, the expression for fogging the scene can be factored into a series fogged image layers combined with the over operator:

(hF atop B) over (fF atop A) over F

Each fogged surface can be placed in a separate sprite:
sprite 1=hF atop B
sprite 2=fF atop A
sprite 3=F Each of the objects can move in (x,y) directions in the scene without re-rendering. If an object moves in the z direction, this object can be rendered independently to a new sprite layer, without re-rendering the other fogged objects in separate sprites. The non-changing (or imperceptibly changing) sprites can retain their original color values for more than one frame in an animation sequence. To compute each output image, the rendering system can composite the separate layers, including both re-used and/or re-rendered fog layers, using the over image operator.

Conclusion

While the invention is explained with reference to a specific rendering architecture, it is important to emphasize that it can be employed in a variety of graphics rendering architectures, whether they implement a frame buffer or a chunking architecture as described above. The fog model applies to a layered graphics pipeline and more conventional rendering pipeline where all geometry is rendered to a single output image, rather than independent layers. The precise logic or software instructions used to implement the fog model can vary as well.

In view of the many possible embodiments to which the principles of my invention may be applied, it should be recognized that the illustrated embodiment is only an example of the invention and should not be taken as a limitation on the scope of the invention. Rather, the scope of the invention is defined by the following claims. I therefore claim as my invention all that comes within the scope and spirit of these claims.

What is claimed is:

1. In a graphics rendering system for generating an output image from a 3D graphics scene having a viewpoint and graphical object models, a method for simulating fog in the 3D graphics scene, the method comprising:

for a pixel having a color A and being rasterized for an object in the 3D graphics scene, computing an amount of fog $f$ of color F between the viewpoint and the object, wherein A comprises color components and an opacity component;

applying the amount of fog $f$ between the viewpoint and the object to the pixel using at least F and A in an atop image operator, wherein applying the amount of fog comprises the following (a)–(c)

(a) multiplying each of the color and opacity components of the pixel by a factor (1–$f$) to compute a first intermediate result, where $f$ is a dissolve factor representing an amount of fog between the viewpoint in the scene and pixel depth of the pixel;

(b) multiplying color components of a fog color value F by the opacity component of the pixel, and by the dissolve factor $f$ to compute a second intermediate result; and (c) adding the first and second intermediate results to compute a fogged pixel; and repeating the above for additional pixels rasterized for the object to compute an image simulating the object in fog.

2. The method of claim 1 further including repeating the method for a second object and compositing the pixels resulting from applying fog using an atop operator to each of the objects to compute an image simulating the objects in fog.

3. The method of claim 2 including separately computing fogged image layers representing fogged pixels of the objects using an atop operator; and compositing the fogged image layers computed using an atop operator, said compositing using an over image operator to compute a composite image.

4. The method claim 1 wherein the method computes each fogged pixel according to the following expression, $fF$ atop $A$;

where $f$ is the amount of fog, F is fog color, and A is a color of the pixel being fogged.

5. The method of claim 1 including computing fogged image layers for objects in the graphics scene using an atop image operator to compute each of the fogged image layers; and combining each of the fogged image layers into an output image using an over image operator to combine the fogged image layers.

6. The method of claim 1 including independently computing fogged image layers for objects in the graphics scene; and approximating motion of a moving object in the scene in an (x,y) plane relative to a viewpoint of the scene by moving a fogged image layer representing the moving object in the (x,y) plane.

7. The method of claim 1 wherein the object is a glowing object, having pixels with zero alpha components and non-zero color components, and wherein fog is applied to the glowing object according to the following formula:

(F atop A) over F.

8. The method of claim 1 wherein at least two fogged pixels from different objects at a pixel location are combined according to the following formula, wherein the pixels have colors A and B:

(hF atop B) over (fF atop A) over F, where A and B are pixel color values from the different objects and the pixel of color B is in front of the pixel of color A relative to the viewpoint, h is an amount of fog from the viewpoint to the pixel of color B, and $f$ is an amount of fog from the viewpoint to the pixel of color A.

9. The method of claim 8 wherein more than two pixels from different objects at a pixel location are fogged according to an expression (xF atop X) where X are color values of an object and x is an amount of fog from the viewpoint to pixel X; and wherein the fogged pixels are combined using the over operator.

10. A computer-readable medium having computer executable instructions for performing the method of claim 1.

11. In a graphics rendering system for generating an output image from a 3D graphics scene having a viewpoint and graphical object models, a method for simulating fog in the 3D graphics scene, the method comprising:

for a pixel having a color A and being rasterized for an object in the 3D graphics scene, computing an amount of fog $f$ of color F between the viewpoint and the object, wherein A comprises an opacity component;

applying the amount of fog $f$ between the viewpoint and the object to the pixel using at least F and A in an atop image operator;

repeating the above for additional pixels rasterized for the object to compute an image simulating the object in fog;

simulating motion of a moving object in the scene in a z-direction relative to the viewpoint of the scene by rendering the moving object, including fogging the pixels of the moving object with a new fog amount, to compute a fogged image layer representing the moving object; and re-using a previously computed fogged image layer by compositing the fogged image layer representing the moving object with the previously computed fogged layer to compute an output image.

12. In a graphics rendering system for generating an output image from a 3D graphics scene, a fog simulator for applying fog of color F to a pixel comprising a color component A, wherein A comprises an opacity value, the fog simulator comprising:

an amount of fog calculator for calculating an amount of fog $f$ between the viewpoint and an object; and a fog applier using A, F and $f$ in an atop image operator to apply the amount of fog $f$ of color F to the pixel comprising a color A, wherein A comprises an opacity value; wherein the atop image operator comprises:

a first multiplier for multiplying the amount of fog $f$ and opacity of the pixel to compute $fA_\alpha$;

a second multiplier for multiplying $fA_\alpha$ and a fog color F to compute $fA_\alpha F$;

a third multiplier for multiplying $(1-f)$ and pixel color A to compute $(1-f)A$; and an adder for adding the results of the second and third multipliers to compute a fogged pixel via the atop image operator.

13. The fog simulator of claim 12 further including:

a rasterizer for computing pixel color, opacity and depth values for pixel locations in a view space from geometric primitives in the object, for computing the amount of fog $f$, and for communicating the pixel color and opacity values and the amount of fog $f$ to the fog applier.

14. The fog simulator of claim 12 further including an over image operator in communication with the adder for compositing the fogged pixel computed by the adder via the atop image operator with a pixel generated from a different object.

15. A graphics rendering system including a fog mode for applying fog to objects rendered as pixels to simulate fog, the graphics rendering system comprising:

a rasterizer for computing pixel color, opacity and depth values for pixel locations in a view space from geometric primitives in the objects, and for computing an amount of fog $f$ between a viewpoint and an object surface of one of the objects being rendered;

a fog applicator for applying the amount of fog of a predetermined color to rasterized pixels from the rasterizer using an atop image operator to yield a plurality of fogged pixels from different objects, wherein the fogged pixels are fogged using an atop image operator; and a compositor for compositing the plurality of fogged pixels from different objects together to compute a composite pixel value, wherein the plurality of fogged pixels are fogged using an atop image operator; wherein the fog is of a color F;

rasterized pixels from the rasterizer each comprise color components A, the color components A each comprising an opacity component; and the fog applicator is operable for applying the amount of fog of a predetermined color to rasterized pixels from the rasterizer by using at least the following (a)–(c) for a pixel being fogged:

(a) multiplying the color components A, including the opacity component, of the pixel being fogged by a factor (1−$f$) to compute a first intermediate result, where $f$ is a dissolve factor representing an amount of fog between the viewpoint in the scene and pixel depth of the pixel being fogged;

(b) multiplying color components of a fog color value F by the opacity component of the pixel being fogged, and by the dissolve factor $f$ to compute a second intermediate result; and (c) adding the first and second intermediate results to compute a fogged pixel, wherein the fogged pixel is a fogged version of the pixel being fogged.

16. The rendering system of claim 15 wherein the rasterizer and fog applicator are operable to compute fogged image layers independently; and wherein the compositor is operable to combine independently rendered fogged image layers to form an output image for display.

17. In a graphics rendering system for generating an output image from a 3D graphics scene having a viewpoint and graphical object models, a method for simulating fog in the 3D graphics scene, the method comprising:

for a pixel being fogged and rasterized for an object in the 3D graphics scene, wherein the pixel being fogged has color components and an opacity component, computing an amount of fog $f$ of color F between the viewpoint and the object;

applying the amount of fog $f$ between the viewpoint and the object to the pixel being fogged using an atop image operator by performing at least the following (a) (b) and (c):

(a) multiplying the color components and the opacity component of the pixel being fogged by a factor (1−$f$) to compute a first intermediate result, where $f$ is a dissolve factor representing an amount of fog between the viewpoint in the scene and pixel depth of the pixel being fogged;

(b) multiplying color components of a fog color value F by the opacity component of the pixel being fogged, and by the dissolve factor $f$ to compute a second intermediate result; and (c) adding the first and second intermediate results to compute a fogged pixel, wherein the fogged pixel is a fogged version of the pixel being fogged; and repeating the above steps for additional pixels rasterized for the object to compute an image simulating the object in fog.

18. The method of claim 17 wherein the object is a first object and the pixel being fogged is a first pixel being fogged, the method further comprising:

for a second pixel being fogged and rasterized for a second object in the 3D graphics scene, wherein the second pixel being fogged has color components and an opacity component, computing an amount of fog $f$ of color F between the viewpoint and the second object, wherein the second object overlaps the first from the viewpoint;

applying the amount of fog $f$ between the viewpoint and the second object to the second pixel being fogged using an atop image operator by performing at least (a) (b) and (c); and combining the first fogged pixel and the second fogged pixel to compute a composite fogged pixel, wherein the composite fogged pixel is a fogged version of a pixel representing an overlap between the first object and the second object.

19. A computer-readable medium having computer executable instructions for performing the following in a graphics rendering system for generating an output image from a 3D graphics scene having a viewpoint and graphical object models to simulate fog in the 3D graphics scene:

for a pixel being fogged and rasterized for an object in the 3D graphics scene, wherein the pixel being fogged has color components and an opacity component, computing an amount of fog $f$ of color F between the viewpoint and the object;

applying the amount of fog $f$ between the viewpoint and the object to the pixel being fogged using an atop image operator by performing at least the following (a) (b) and (c):

(a) multiplying the color components and the opacity component of the pixel being fogged by a factor (1−$f$) to compute a first intermediate result, where $f$ is a dissolve factor representing an amount of fog between the viewpoint in the scene and pixel depth of the pixel being fogged;

(b) multiplying color components of a fog color value F by the opacity component of the pixel being fogged, and by the dissolve factor $f$ to compute a second intermediate result; and (c) adding the first and second intermediate results to compute a fogged pixel, wherein the fogged pixel is a fogged version of the pixel being fogged; and repeating the above for additional pixels rasterized for the object to compute an image simulating the object in fog.

* * * * *

UNITED STATES PATENT AND TRADEMARK OFFICE
CERTIFICATE OF CORRECTION

PATENT NO. : 6,184,891 B1
DATED : February 6, 2001
INVENTOR(S) : James F. Blinn

It is certified that error appears in the above-identified patent and that said Letters Patent is hereby corrected as shown below:

Column 1,
Line 18, "gnat" should be -- that --.

Column 5,
Line 27, "image,e" should be -- image --.

Column 19, claim 7,
Line 27, "(F atop A) over F." should be -- (*f* F atop A) over F. --

Signed and Sealed this

First Day of January, 2002

Attest:

JAMES E. ROGAN
*Attesting Officer*   *Director of the United States Patent and Trademark Office*